United States Patent Office 3,003,824
Patented Oct. 10, 1961

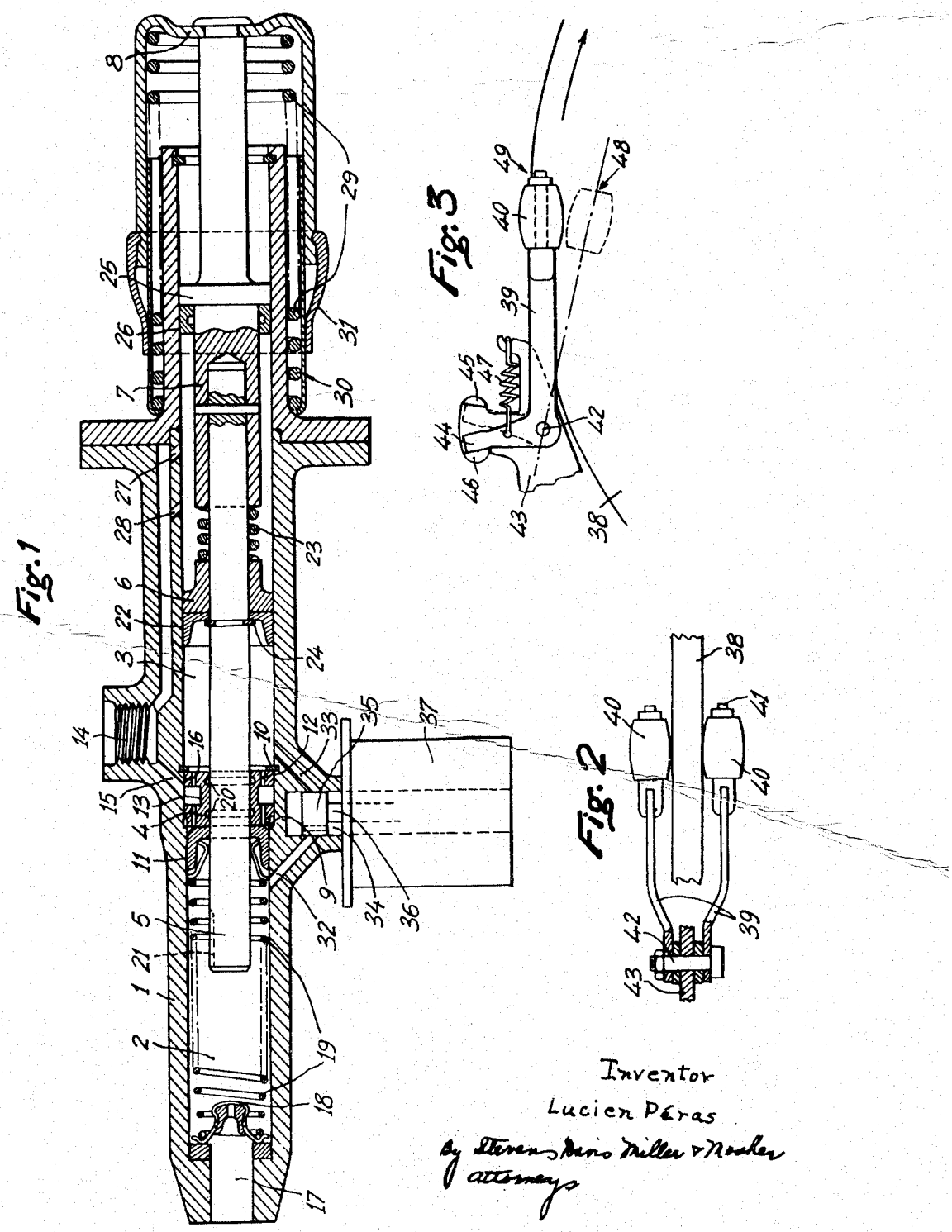

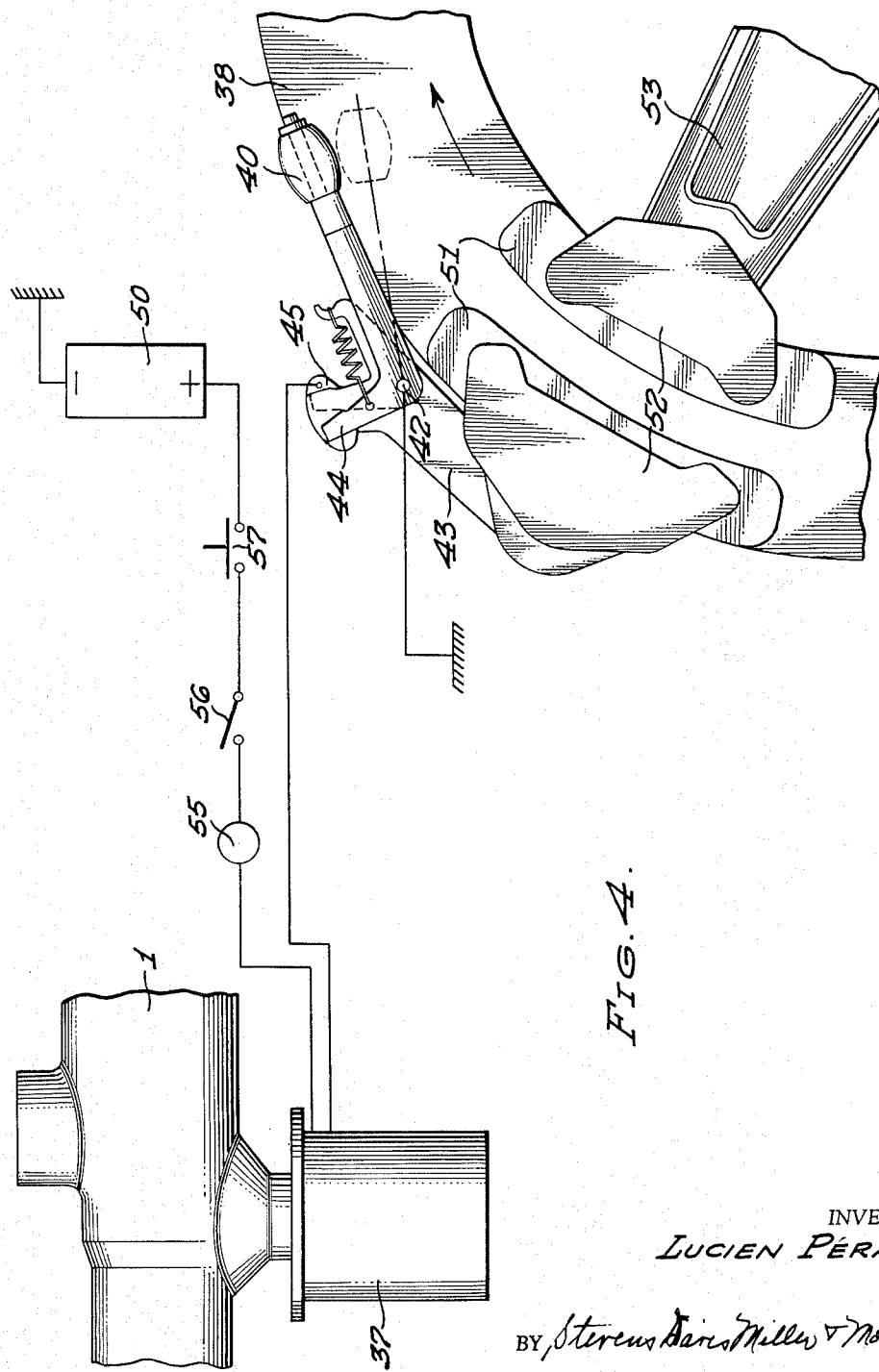

3,003,824
ANTI-SKID DEVICE
Lucien Péras, Billancourt, France, assignor to Regie Nationale des Usines Renault, Billancourt, France
Filed Feb. 25, 1959, Ser. No. 795,539
Claims priority, application France Feb. 26, 1958
2 Claims. (Cl. 303—21)

This invention relates to the braking systems for vehicles of the type which transmit the braking effort by means of a hydraulic fluid, and its chief object is to provide a device adapted to prevent the wheels from locking during a brake application, as they may become locked either by an excessive pressure in the fluid transmitting the braking effort, or by a reduction in the coefficient of friction between the wheel tires and the road surface; it is well known that this occurrence is detrimental both to the tires and to the stability of the vehicle.

The device according to this invention utilizes notably a differential-action master cylinder of the type comprising two pressure-producing chambers whereby, as already known, the brake control action may be stepped down twice or demultiplication as a function of the pressure developing in the brake circuit when the brake shoe linings engage the corresponding members, for example the brake drums or the brake disks. Such stepdown ratio or demultiplication can be defined as being the ratio between the displacement of the brake pedal and the corresponding displacement of the braking elements. In the present case, a master cylinder of the differential action type which has two pistons of different diameters is employed. Such a master cylinder provides for the present control a double demultiplication, that is, a first demultiplication corresponding to the movement of the elements towards the brake surface (rapid filling of the brake cylinders effected by the piston of the greater diameter) and a second demultiplication which is much more important than the preceding one and which permits obtaining in progressive fashion a high braking pressure (resulting from the displacement of the piston of smaller diameter). The present invention is applicable to a cylinder of such a differential type which comprises two distinct pressure chambers mounted in series with two pistons of different diameters working therein and wherein one or the other of the pistons is active in accordance with the pressure developed in the brake circuit. The present invention comprises the novel arrangement of a communication between the two chambers, when the wheels become locked during a brake application, in order to automatically effect a temporary change of demultiplication which will result in unlocking the wheels.

This invention is concerned more particularly with means adapted to interconnect the two pressure chambers of the master cylinder when the wheels become locked during a brake application, so that without modifying the force with which the brake pedal is depressed the actual braking force is reduced automatically as a result of the automatic change taking place in the step-down ratio, this change being followed immediately by the resumption of the normal braking step-down ratio when the wheel or wheels resume its or their rotation; the use of a master cylinder of the type broadly set forth hereinabove being attended but by a small loss of pedal stroke which in no case will exceed any safety limit. Moreover, in spite of its operating characteristic this master cylinder will provide a sufficient braking force when the vehicle is stationary.

To this end and according to a preferred form of embodiment of this invention the device comprises in addition for each wheel a stationary, friction-operated switch co-acting with a member rotating bodily with the wheel and adapted to open or close an electric contact according as the wheel rotates or not, this contact energizing or not a single electromagnet of which the movable member or plunger is operatively connected to, or is formed integrally with, a valve member mounted in a passage interconnecting the two chambers by which the master cylinder is pressurized.

This invention is also concerned with a relatively simple form of embodiment of a master cylinder of the differential-action type which is particularly although not exclusively suitable for the application set forth hereinabove, this master cylinder being remarkable notably in that the partition between the two pressure-building chambers consists of a "floating" valve displaceable to a very moderate extent in the axial direction.

These and other features and advantages of this invention will appear as the following description proceeds with reference to the accompanying drawing forming part of this specification and illustrating diagrammatically by way of example a typical form of embodiment of the invention.

In the drawing:

FIGURE 1 is a longitudinal section showing the differential-action master cylinder with which the electromagnet-operated valve controlling the communication between the pressuring chambers is associated;

FIGURE 2 is a fragmentary plan view showing a wheel switch co-acting with a brake disk;

FIGURE 3 is a side elevational view of this switch, and

FIGURE 4 is a schematic representation of the electrical circuits and contacts and showing in elevation the brakes.

Although the device forming the subject-matter of this invention is suitable for operation with any known type of master cylinder of the differential action type as defined hereinabove, the following description will refer firstly to a form of embodiment of a master cylinder which, although particularly suitable for this use, constitutes a specific subject-matter of the invention, this master cylinder being shown diagrammatically in FIG. 1 during its operation.

This master cylinder comprises a body 1 in which two pressure-building chambers, that is, a front chamber 2 and a rear chamber 3, are formed and separated by a floating valve 4, the movable elements of the master cylinder consisting of a plunger 5 and a piston 6, the former being rigid with the control rod 7 having its outer end provided with a member engageable by the pedal-actuated push-rod.

The floating valve 4 is adapted to effect moderate axial movements in the body of the master cylinder between a shoulder 9 thereof and a circlip 10. It comprises at the front end a conventional cup 11 permitting the flow of control fluid only in the direction from chamber 3 to chamber 2, this fluid flowing in this case along longitudinal passages 12 formed in the valve body. This valve is also formed with a central circular groove 13 permitting the communication between the chamber 3 and the compensation reservoir connected at 14 through a passage 15 and when the floating valve is in its rear position. This passage 15 may be closed by the rear portion 16 of the valve when the latter is in its front position.

The front pressure chamber 2 is connected to the wheel cylinders by means of an outlet 17 closed by a conventional-type residual-pressure valve 18 controlled by a spring 19 bearing against the floating valve 4 in order to urge the latter rearwards.

The floating valve 4 is formed with a central longitudinal aperture or bore slidably engaged by the plunger 5, a pair of packings 20 providing the necessary fluid tightness, except when the device is in its inoperative condition in which case the chambers 2 and 3 communicate with each other by means of a longitudinal groove 21 formed in the front end of the plunger.

The rear pressure-building chamber is also bound by the piston 6 provided with a main cup 22 and slidably mounted on the plunger, a resilient connection in the form of a compression spring 23 being provided between this piston and the control rod 7, a plunger-carried circlip 24 preventing the piston from moving axially forwards, as shown.

The control rod 7 has an integral piston forming portion 25 associated with a packing 26 to define the chamber (in which no pressure is built up during a brake application) behind the piston 6, this chamber being normally connected through a passage 27 to the compensation reservoir, whereas the passage 28 normally connects the same compensation reservoir to the chamber 3.

The movable assembly is also normally urged backwards by the return spring 29 of cap 8, the reference numerals 30 and 31 designating guide and protection members.

The operation of this master cylinder alone will now be described in order to afford a clear understanding of the operation of the complete device forming the subject-matter of this invention.

When the member 8 engageable by the pedal-actuated push-rod is moved forwards, that is, in the left-hand direction of FIG. 1, the piston 6 and plunger cause the chambers 2 and 3 to become pressurized as the floating valve is moved immediately in the same direction and closes the passage 15 as a consequence of the pressure built up in chamber 3 and of the frictional engagement resulting from the provision of packings 20 between the valve body and the plunger. The fluid flows from chamber 3 to chamber 2 via the passages already set forth, and the control fluid is forced through the outlet 17 towards the wheel cylinders. Under these conditions, the brake linings are moved towards the brake surfaces with a relatively moderate step-down ratio as a function of the fluid displacement resulting from the action of plunger 5 and piston 6.

To this end the spring 23 associated with piston 6 is so calculated that this piston is capable of maintaining in the chamber 3 the fluid pressure corresponding substantially to that necessary for neutralizing the action of the brake lining return means.

However, immediately as these brake linings engage the brake members with which they are to co-act during a brake application, the movable assembly being still pushed forwards, the pressure increases in the circuit, the spring 23 yields and as the pressure becomes preponderant in the front chamber 2, the floating valve is pushed to the rear, thus causing the chamber 3 to communicate with the compensation reservoir.

As a result, the piston 6 continues its forward stroke without generating any pressure in the chamber 3 and the fluid forced through the pipe lines to the brake is the fluid resulting from the displacement of the plunger in its front chamber 2, so that the brake lining movement will now take place with the highest desirable and selected step-down ratio.

When the brake pedal is released, the control fluid is returned to the master cylinder by the brake return members, and this fluid flows firstly into chamber 2, then into chamber 3 through the groove 21 of the plunger, the fluid being distributed under normal conditions by the passages 15, 27 and 28.

This invention also consists in providing means for interconnecting the two pressure-building chambers of a master cylinder of the type set forth hereinabove when the wheels are locked as a consequence of a brake application.

To this end, the two chambers 2, 3 are adapted to be interconnected by passages 32, 33 formed on either side of the aforesaid floating valve and leading to a bore 34 in which a slide valve 35 responsive to an electromagnet 37 controls the communication between these chambers. This slide valve 35 is carried by a rod 36 constituting the core or plunger of the electromagnet 37; the latter is energized according as the wheels rotate or not, the current source being constituted by the battery 50 of the vehicle.

For this purpose each wheel is assumed to comprise in this example a brake disk 38 (see FIGS. 2 to 4) having associated therewith a friction-actuated switch.

In the wheel brake, as partly shown in FIGURE 4, the disc 38 rotates with the wheel and is adapted to be braked by the tightening of lateral brake elements or brake shoes 51. These elements are carried by a mounting 52 which is supported by an arm 53 and is stationary with respect to the wheel and comprises a hydraulic device for tightening the disc (not shown in the drawing) supplied by the master cylinder 1. The disc 38 is supported by lateral arms (not shown) which connect it with the wheel, the brake elements 51 providing a passage for said arms which can be seen in the drawing.

The friction member of this switch may consist for example of a pair of rollers 40 urged for engagement with the two faces of the disk 38 by resilient arms 39, these rollers being mounted for free rotation on longitudinal pins 41. Moreover, the arms 39 are pivoted about a pin 42 supported by a bracket or like support 43 rigid with the fixed structure of the wheel in this case integral with the mounting 52. Solid with the arms 39 are switch levers 44 of which the angular movements are limited by abutments 45, 46 formed on the support 43. One of these abutments, in this abutment 45 is normally engaged by the lever 44 due to the action of a spring 47 and constitutes with the latter an electric contact adapted to close the circuit for energizing the electromagnet 37.

Under these conditions the electromagnet is energized when the wheel is locked (position 48 of friction member) and de-energized when the wheel rotates since in this case the rollers 40 of the friction member assume the position shown at 49 (FIG. 3) in which the arms 39 extend at right angles to the radius of the wheel disk which passes through the point of contact of the rollers.

It will be noted that when the rotation of disk 38 is stopped, the friction rollers are urged to position 48 by rotating about their pins 41, this rotation promoting the regularity of their surface wear by changing each time the point or zone of static contact between these rollers and the disk, as they are not rotatably driven when the friction member moves from position 48 to position 49.

On the other hand, the slide valve 35 is so arranged as to occlude the communication between chambers 2 and 3 through passages 32, 33 when the electromagnet is de-energized, and to permit this communication when the electromagnet is energized.

The device described hereinabove operates as follows:
When the vehicle is running and the brakes are applied, if the wheels continue to rotate the friction members will remain in position 49 (to which they have been brought beforehand) so that the electromagnet 37 remains de-energized and therefore the communication between chambers 2 and 3 is shut off by the slide valve 35; under these conditions, the brake application is effected in the manner already set forth in the description of the operation of the master cylinder.

In case one or more wheels of the vehicle become jammed, the corresponding disk or disks are also locked and the relevant friction member or members resume their inoperative position 48 in which the electromagnet becomes energized, the slide valve 35 permitting in this case the communication between the chambers 2 and 3 of the master cylinder.

As a result, the pressure drops in chamber 2 and as a brake application is taking place the floating valve 4 is caused immediately to engage its front abutment, thus isolating the chamber 3 from the compensation reservoir, so that the step-down ratio with which the control action is transmitted is reduced to its lowest value corresponding to that provided for the lining approach.

Thus, without varying the foot pressure exerted on the brake pedal, the force with which the linings are applied on the brake surfaces decreases automatically and the wheel or wheels involved are unlocked, and consequently the relevant friction member or members is or are again carried along in the direction to break the energization of the electromagnet, the slide valve 35 re-closing in this case the communication between the pressure chambers, and the considerably higher step-down ratio for transmitting the normal braking force is restored automatically as described hereinabove in connection with the operation of the master cylinder alone.

The loss of stroke in the movement of the member 8 engaged by the pedal-operated push-rod, which results from the operation of the device, corresponds simply to the displacement of the floating valve between its two abutments, that is, to an extremely low value.

Various safety devices may be associated with this device in order to protect same against any incident likely to maintain the communication between the pressure chambers of the master cylinder beyond the desired time limits, for example by fortuitous energization of the electromagnet, for the braking action would be impaired considerably in this case. Thus, to this end, a tell-tale or signal lamp 55 may be mounted on the instrument panel of the vehicle to warn the driver that the electromagnet circuit is closed; a switch 56 may be provided near this lamp so that the device may be rendered inoperative by opening its circuit when the light signal indicates that the electromagnet is energized improperly.

Besides, a switch 57 may be inserted in the electric circuit for preventing the electromagnet from becoming energized unless the brake pedal has been depressed to a predetermined minimum extent.

It will be noted that when the vehicle is operated but held against movement the hydraulic braking action is still available with the aforesaid moderate step-down ratio which is amply sufficient in this case.

I claim:
1. A device for preventing the wheels of a vehicle equipped with a hydraulic brake system from locking, said hydraulic brake system comprising a brake circuit supplied by differential type master cylinder including two chambers in which work respectively a main piston and a secondary piston of smaller diameter, non-return means allowing the chamber of the main piston to communicate with the chamber of the secondary piston and communicating itself with the brake circuit, said device including means responsive to the pressure developed in the master cylinder to establish a communication from the chamber of the main piston to the atmosphere starting at a predetermined pressure in the brake circuit, said device additionally comprising a passage interconnecting said two chambers, a valve means controlling said passage, an electromagnet actuating the valve means, a source of electrical energy connected to the electromagnet, switches controlling the connection of the source of electrical energy and the electromagnet, friction members mounted separately on each wheel of the vehicle and coacting with a member rigid with the corresponding wheel and controlling the switches so as to cause said chambers to communicate with each other when one or more wheels become locked during a brake application in such a way that there is an automatic reduction of the fluid pressure as long as a wheel is locked.

2. Device according to claim 1, in which said means responsive to the pressure in the master cylinder includes a floating valve mounted in sliding fashion around the secondary piston and associated with the said non-return means to separate the two chambers, said floating valve having a limited axial displacement in the master cylinder and being adapted to establish a communication, in its withdrawn position, between the chamber of the main piston and the atmosphere, said main piston being itself mounted in axially movable fashion with respect to the secondary piston against the force of a return spring adapted to yield when the said predetermined pressure is reached.

References Cited in the file of this patent

UNITED STATES PATENTS 2,736,395    Keeler _____ Feb. 28, 1956